(12) United States Patent
Lee et al.

(10) Patent No.: US 11,243,594 B2
(45) Date of Patent: Feb. 8, 2022

(54) ELECTRONIC DEVICE SUPPORTING CONNECTION WITH EXTERNAL DEVICE AND POWER CONSUMPTION REDUCING METHOD WHEN USING ELECTRONIC DEVICE IN CONNECTION WITH EXTERNAL DEVICE

(71) Applicant: Samsung Electronics Co., Ltd., Suwon-si (KR)

(72) Inventors: Wookwang Lee, Suwon-si (KR); Kyounghoon Kim, Suwon-si (KR); Byungjun Kim, Suwon-si (KR); Taewoong Kim, Suwon-si (KR); Sanghyun Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/947,548

(22) Filed: Aug. 6, 2020

(65) Prior Publication Data

US 2021/0089099 A1 Mar. 25, 2021

(30) Foreign Application Priority Data

Sep. 20, 2019 (KR) .......................... 10-2019-0116402

(51) Int. Cl.
*G06F 1/26* (2006.01)
*G06F 1/3234* (2019.01)
(Continued)

(52) U.S. Cl.
CPC ............ *G06F 1/266* (2013.01); *G06F 1/3234* (2013.01); *G06F 1/3296* (2013.01); *G06F 13/20* (2013.01);
(Continued)

(58) Field of Classification Search
CPC .......... G06F 1/26; G06F 1/266; G06F 1/3215; G06F 1/3234; G06F 1/3296; G06F 13/20;
(Continued)

(56) References Cited

U.S. PATENT DOCUMENTS 6,961,345 B2 11/2005 Mizuguchi et al.
9,037,756 B2 5/2015 Lee
(Continued)

FOREIGN PATENT DOCUMENTS

JP 2001-251326 A 9/2001
JP 2018018414 A 2/2018
(Continued)

OTHER PUBLICATIONS

'Integrated circuit' in "The Free on Line Dictionary of Computing". Denis Howe. Onlien Jul. 3, 1997. Retrieved from Internet Apr. 19, 2021. <http://foldoc.org/integrated+circuit>. (Year: 1997).*
(Continued)

*Primary Examiner* — Thomas J. Cleary

(57) ABSTRACT

An electronic device including a PDIC, a charging IC, and a processor. The PDIC determines whether an external device is connected to the USB port, through a first pin of a USB port. The charging IC outputs a first voltage, which is a voltage obtained by boosting a voltage provided by a battery, to the external device through a second pin, when the external device is connected to the USB port. The processor is configured to determine whether the external device connected to the USB port is a first external device having a specified VID and a specified PID, through a third pin of the USB port, and to transmit a first signal, which controls the charging IC to output a second voltage having a magnitude less than the first voltage, to the charging IC when the first external device is connected to the USB port.

20 Claims, 13 Drawing Sheets

(51) Int. Cl.
- *G06F 13/20* (2006.01)
- *G06F 13/42* (2006.01)
- *H01R 13/66* (2006.01)
- *G06F 1/3296* (2019.01)

(52) U.S. Cl.
CPC ..... *G06F 13/4282* (2013.01); *H01R 13/6675* (2013.01); *G06F 2213/0042* (2013.01)

(58) Field of Classification Search
CPC ......... G06F 13/4282; G06F 2213/0042; H01R 13/6675
See application file for complete search history.

(56) References Cited

U.S. PATENT DOCUMENTS

| | | | |
|---|---|---|---|
| 9,235,249 | B2 | 1/2016 | Bencak et al. |
| 9,348,382 | B2 | 5/2016 | Helfrich et al. |
| 9,627,899 | B2 | 4/2017 | Lee |
| 9,728,988 | B2 | 8/2017 | Ye et al. |
| 9,923,396 | B2 | 3/2018 | Lei et al. |
| 10,209,752 | B2 | 2/2019 | Helfrich et al. |
| 10,468,893 | B2 | 11/2019 | Chen et al. |
| 2002/0162036 | A1 | 10/2002 | Kim et al. |
| 2011/0016253 | A1* | 1/2011 | Kakish ................... G06F 13/385 710/313 |
| 2011/0231682 | A1* | 9/2011 | Kakish ................... G06F 1/3203 713/320 |
| 2013/0339769 | A1* | 12/2013 | Waters .................... G06F 1/266 713/310 |
| 2014/0089532 | A1* | 3/2014 | Manor ................... G06F 13/102 710/8 |
| 2014/0245030 | A1* | 8/2014 | Helfrich .................. H02M 7/04 713/300 |
| 2016/0064978 | A1 | 3/2016 | Lei et al. |
| 2016/0226282 | A1 | 8/2016 | Ye et al. |
| 2016/0266625 | A1 | 9/2016 | Helfrich et al. |
| 2016/0315490 | A1* | 10/2016 | Xu ....................... H02J 2207/20 |
| 2017/0054310 | A1* | 2/2017 | Chen ....................... H02J 7/04 |
| 2017/0109311 | A1* | 4/2017 | Gerber ................ G06F 13/4068 |
| 2017/0222459 | A1* | 8/2017 | Kang ..................... H01R 31/065 |
| 2017/0230074 | A1* | 8/2017 | Rose .................... H04B 1/1036 |
| 2018/0062325 | A1* | 3/2018 | Kim ................... H01R 13/6683 |
| 2018/0276178 | A1 | 9/2018 | Lee et al. |
| 2019/0131810 | A1* | 5/2019 | Lim ....................... H02J 7/0029 |
| 2019/0138469 | A1* | 5/2019 | Lee .......................... G06F 9/445 |
| 2019/0258832 | A1* | 8/2019 | Jung .................... H02J 7/00045 |
| 2019/0286817 | A1* | 9/2019 | Butler ................. G06F 13/4282 |
| 2020/0081468 | A1* | 3/2020 | Tang ...................... H02M 3/156 |
| 2020/0089637 | A1* | 3/2020 | Ng ........................ G06F 13/385 |
| 2020/0144776 | A1* | 5/2020 | Chin ...................... H01R 43/26 |
| 2021/0034127 | A1* | 2/2021 | Lee ........................... G06F 1/28 |

FOREIGN PATENT DOCUMENTS

| | | |
|---|---|---|
| KR | 10-2006-0095386 A | 8/2006 |
| KR | 10-2007-0053913 A | 5/2007 |
| KR | 10-2019-0100601 A | 8/2019 |

OTHER PUBLICATIONS

Peacock, Craig. "USB Descriptors". Beyond Logic. Online Apr. 12, 2018. Retrieved from Internet Apr. 16, 2021. <https://www.beyondlogic.org/usbnutshell/usb5.shtml#InterfaceDescriptors>. (Year: 2018).*

Christiansen, Morten. "New USB Audio Class for USB Type-C Digital Headsets". Desginware Technical Bulletin. Online May 7, 2018. Retrieved from Internet Apr. 16, 2018. <https://web.archive.org/web/20180507221645/https://www.synopsys.com/designware-ip/technical-bulletin/usb-audio-dwtb-q117.html>. (Year: 2018).*

Notification of Transmittal of the International Search Report and the Written Opinion of the International Searching Authority, or the Declaration dated Nov. 9, 2020 in connection with International Patent Application No. PCT/KR2020/009669, 10 pages.

European Search Report dated Feb. 8, 2021 in connection with European Application No. 20190902.5, 10 pages.

Rogers, Andrew, "AN1941—USB to 12C Bridging with Microchip USB 2.0 Hubs," Microship, Technology Inc., Jan. 1, 2016, 14 pages. URL:http://ww1.microchip.com/downloads/en/AppNotes/00001941B.pdf.

Triggs, Robert, "How USB-C headphones work," SoundGuys, Nov. 6, 2018, 6 pages. URL:https://www.soundguys.com/usb-audio-explained-18563/.

* cited by examiner

| AUDIO FUNCTION CATEGORY CODE 1010-1 | |
|---|---|
| SPEAKER | 0x01 |
| HOME THEATER | 0x02 |
| MICROPHONE | 0x03 |
| HEADSET | 0x04 |

FIG.11

ELECTRONIC DEVICE SUPPORTING CONNECTION WITH EXTERNAL DEVICE AND POWER CONSUMPTION REDUCING METHOD WHEN USING ELECTRONIC DEVICE IN CONNECTION WITH EXTERNAL DEVICE

CROSS-REFERENCE TO RELATED APPLICATION

This application is based on and claims priority under 35 U.S.C. § 119 to Korean Patent Application No. 10-2019-0116402, filed on Sep. 20, 2019, in the Korean Intellectual Property Office, the disclosure of which is incorporated by reference herein its entirety.

BACKGROUND

1. Field

The disclosure relates to an electronic device supporting a connection with an external device, and a method of reducing power consumption when an electronic device is used in connection with the external device.

2. Description of Related Art

An electronic device may be used while being connected to an external device. For example, an earphone may be connected to the electronic device through an earphone connection terminal disposed in the electronic device. The conventional earphone connection terminal may be a 3.5 Pi connection terminal. The electronic device may supply power to drive the connected external device. The external device may receive data from the electronic device and may output the data to a user. For example, when the earphone is connected to the electronic device, a digital sound source may be played by the earphone by supplying power and data to the earphone through the earphone connection terminal. For another example, the earphone equipped with a recording function may be connected to the electronic device, and the earphone may record an external sound such as a user's utterance.

In recent electronic devices, it is possible to remove the connection terminal connected to the external device in the analog scheme and to arrange the USB port to be connected in the digital scheme. For this reason, the external device such as an earphone may be connected to a USB port, not the conventional earphone connection terminal. For example, the USB port may be a USB Type-C port.

The above information is presented as background information only to assist with an understanding of the disclosure. No determination has been made, and no assertion is made, as to whether any of the above might be applicable as prior art with regard to the disclosure.

SUMMARY

When an external device is used in connection with a USB port, it is identified that the external device is connected to the USB port. An electronic device may supply power through a VBUS pin included in the USB port. The electronic device may transmit and receive data to and from the external devices through D+ and D− pins included in the USB port.

The electronic device may supply the voltage specified in the USB specification through the VBUS pin to supply power to the external device connected to the USB port. For example, the electronic device may output a 5 V power supply through the VBUS pin. According to the USB standard, it is possible to supply a high voltage from the electronic device to the external device, as compared to the conventional 3.5 Pi connection terminal. Accordingly, the consumption of the current flowing through the external device increases, and thus the battery of the electronic device may be quickly discharged.

Aspects of the disclosure are to address at least the above-mentioned problems and/or disadvantages and to provide at least the advantages described below. Accordingly, an aspect of the disclosure is to provide an electronic device capable of reducing power consumption when being used while an external device is connected to a USB port, and a method for reducing power consumption that reduces power consumption when an external device is connected to the USB port.

In accordance with an aspect of the disclosure, an electronic device may include a power delivery IC (PDIC) determining whether an external device is connected to a USB port, a charging IC supplying power from a battery of the electronic device to the external device through the USB port, and a processor controlling the charging IC. The PDIC may determine whether the external device is connected to the USB port, through a first pin of the USB port. The charging IC may output a first voltage, which is a voltage obtained by boosting a voltage provided by the battery, to the external device through a second pin, when the external device is connected to the USB port. The processor may be configured to determine whether the external device connected to the USB port is a first external device having a specified Vendor ID (VID) and a specified Product ID (PID), through a third pin of the USB port; and to transmit a first signal, which controls the charging IC to output a second voltage having a magnitude less than the first voltage, to the charging IC when the first external device is connected to the USB port.

In accordance with another aspect of the disclosure, a method of reducing power consumption when an electronic device is used in connection with an external device may include determining, by a PDIC of the electronic device, whether the external device is connected to a USB port of the electronic device, through a first pin of the USB port, outputting, by a charging IC supplying power from a battery of the electronic device to the external device through the USB port, a first voltage, which is a voltage obtained by boosting a voltage provided by the battery, to the external device through a second pin when the external device is connected to the USB port, determining, by a processor controlling the charging IC, whether the external device connected to the USB port is a first external device having a specified VID and a specified PID, through a third pin of the USB port, and transmitting, by the processor, a first signal for controlling the charging IC to output a second voltage having a magnitude less than the first voltage, to the charging IC when the first external device is connected to the USB port.

In accordance with another aspect of the disclosure, an electronic device may include a PDIC determining whether an external device is connected to a USB port, a charging IC supplying power from a battery of the electronic device to the external device through the USB port, and a processor controlling the charging IC. The PDIC may determine whether the external device is connected to the USB port, through a first pin of the USB port. The charging IC may output a first voltage, which is a voltage obtained by boosting a voltage provided by the battery, to the external device through a second pin, when the external device is connected to the USB port. The processor may be configured to identify a category field of the external device and to transmit a first signal for controlling the charging IC to output a second voltage having a magnitude less than the first voltage, to the charging IC when detailed information of the category field corresponds to a specified first external device.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 illustrates a diagram of an audio function category code according to an embodiment;

With regard to description of drawings, the same or similar components may be marked by the same or similar reference numerals.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to accompanying drawings. However, those of ordinary skill in the art will recognize that modification, equivalent, and/or alternative on various embodiments described herein may be variously made without departing from the scope and spirit of the disclosure.

Figure 1:
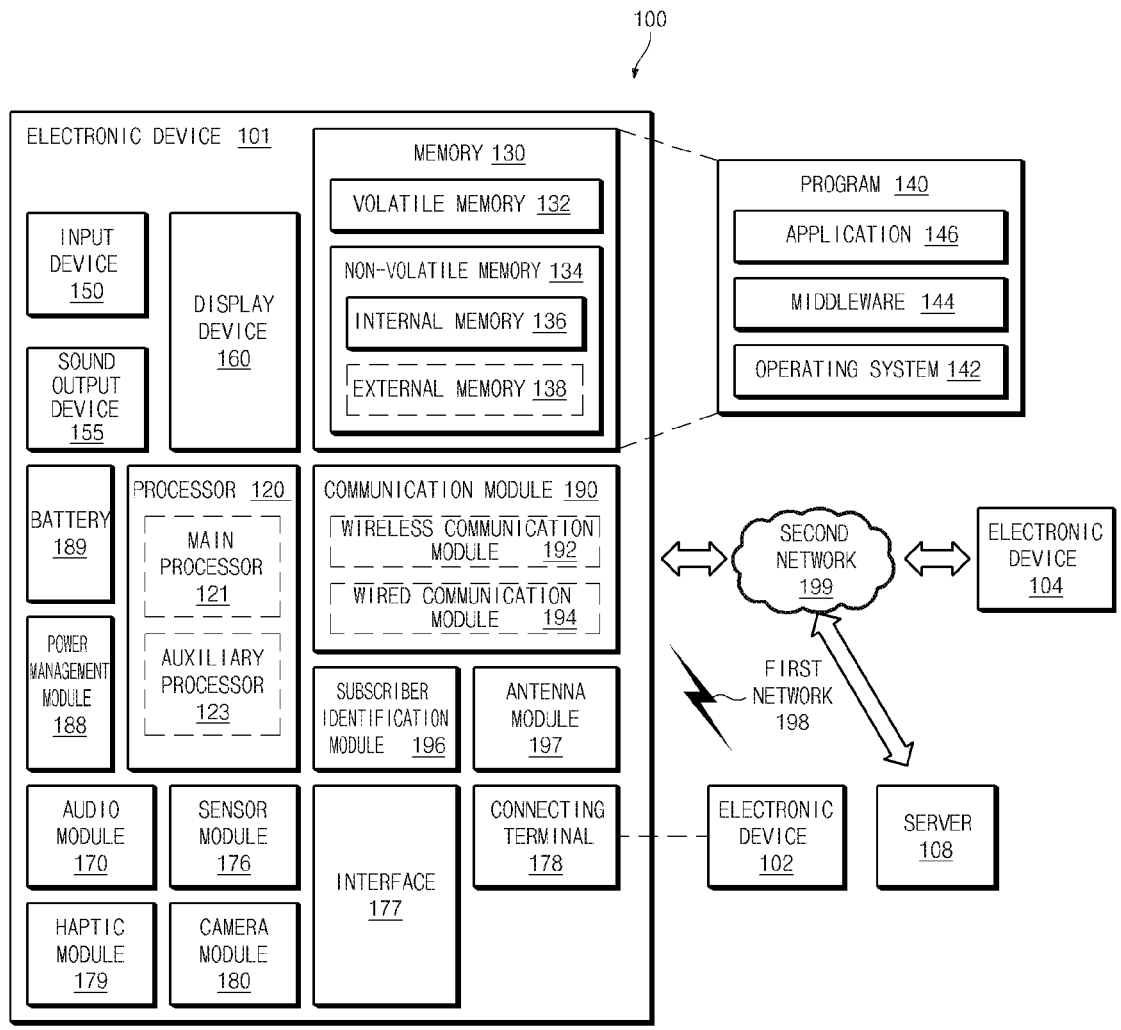
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
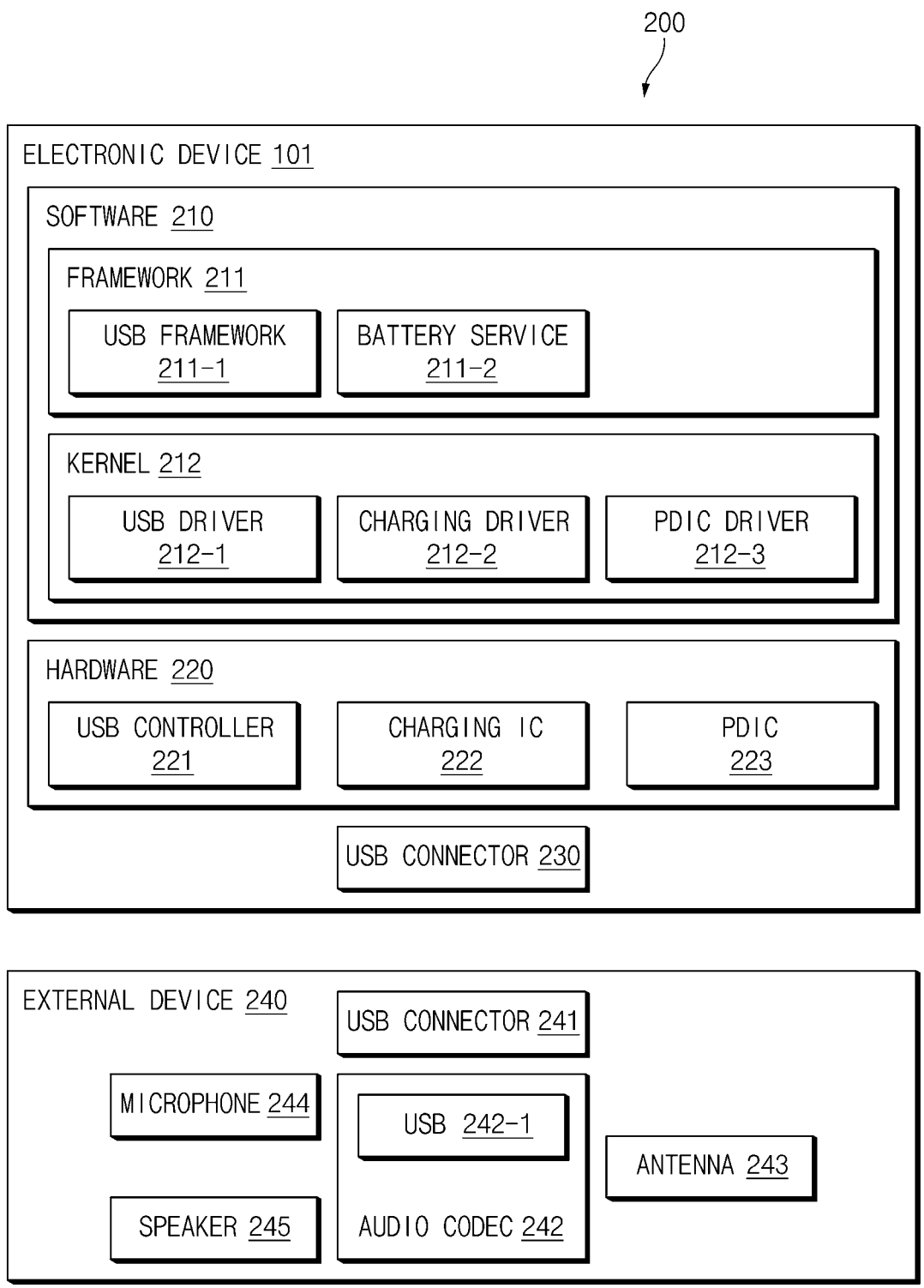
FIG. 2 illustrates a block diagram of an electronic device and an external device according to an embodiment.

FIG. 2 illustrates a block diagram 200 of the electronic device 101 and an external device 240 according to an embodiment. The electronic device 101 according to an embodiment may include software 210, hardware 220, and a USB connector 230.

In an embodiment, the software 210 may execute programs (e.g., the program 140 in FIG. 1), such as applications (e.g., the applications 146 in FIG. 1) for operation of the electronic device 101. The software 210 may include a framework 211 and a kernel 212.

In an embodiment, the framework 211 may be the environment of the software 210 provided in the collaborative form such that design and implementation of parts corresponding to specific functions of the software 210 may be reused to facilitate the development of the application 146 of the software 210 or solutions. The framework 211 may include a USB framework 211-1 controlling a USB connection being one of methods for connecting with the external device 240, and a battery service 211-2 controlling the charging and/or discharging of the battery (e.g., the battery 189 of FIG. 1) included in the electronic device 101.

In an embodiment, the kernel 212 may perform resource allocation on the running program 140 under the control of a processor (e.g., processor 120 of FIG. 1) constituting an operating system (e.g., the operating system 142 of FIG. 1) and the operating system 142. The kernel 212 may include a USB driver 212-1 establishing a connection during a USB connection, a charging driver 212-2 controlling the charging mode of the battery 189, and/or a PDIC driver 212-3 that detects resistance applied to the USB connector 230 and is responsible for power delivery (PD) communication when an external device 240 is connected to a USB connector 230. The USB driver 212-1 according to an embodiment may be included in the processor 120.

In an embodiment, the hardware 220 may physically constitute the electronic device 101. The hardware 220 may include a USB controller 221, a charging IC 222, and a Power Delivery IC (PDIC) 223.

In an embodiment, the USB controller 221 may be included in the processor 120. The USB controller 221 may perform USB data communication using the D+ line and D− line included in the USB connector 230.

In an embodiment, the charging IC 222 may be included in the PMIC (e.g., the power management module 188 of FIG. 1). The charging IC 222 may charge the battery 189, using the VBUS line included in the USB connector 230. The charging IC 222 may supply a VBUS output to the external device 240.

In an embodiment, the PDIC 223 may be included in the PMIC 188. The PDIC 223 may perform bi-phase marked communication (BMC) through a CC pin included in the USB connector 230. The BMC may be a single wire communication that transmits and receives signals using a single wire. The PDIC 223 may determine a role of power and a role of data.

In an embodiment, the blocks included in the hardware 220 may be mapped onto blocks included in the software 210, respectively. The USB driver 212-1, the charging driver 212-2, and/or the PDIC driver 212-3 may perform message transmission and/or communication with one another through a notify message or a callback function.

In an embodiment, the USB connector 230 may be connected to the external device 240 capable of USB connection. The USB connector 230 may be a USB port. The USB port may be a USB Type-C port.

In an embodiment, the external device 240 may include a USB connector 241, an audio codec 242, a USB 242-1, an antenna 243, a microphone 244, and/or a speaker 245. For example, the external device 240 may be an earphone of USB Type-C. The external device 240 may be connected to the electronic device 101 through the USB connector 241. The external device 240 may convert voice data received from the electronic device 101 through the USB 242-1 into the audio codec 242. The external device 240 may wirelessly communicate with the electronic device 101, using the antenna 243. The external device 240 may receive a user's voice, using the microphone 244. The external device 240 may output the received voice, using the speaker 245.

In an embodiment, the communication speed at which the USB connectors 230 and 241 are performed may be set to the slowest speed among the communication speed of the electronic device 101, the communication speed of the external device 240, and the communication speed of the USB cable connecting the USB connector 230 to the USB connector 241. The communication speed may be the low speed of about 1.5 Mbps, the full speed of about 12 Mbps, the high speed of about 480 Mbps, and/or the super speed of 5 Gbps or more. USB 2.0 may support the high speed. USB 3.0 or higher may support the super speed.

Figure 3:
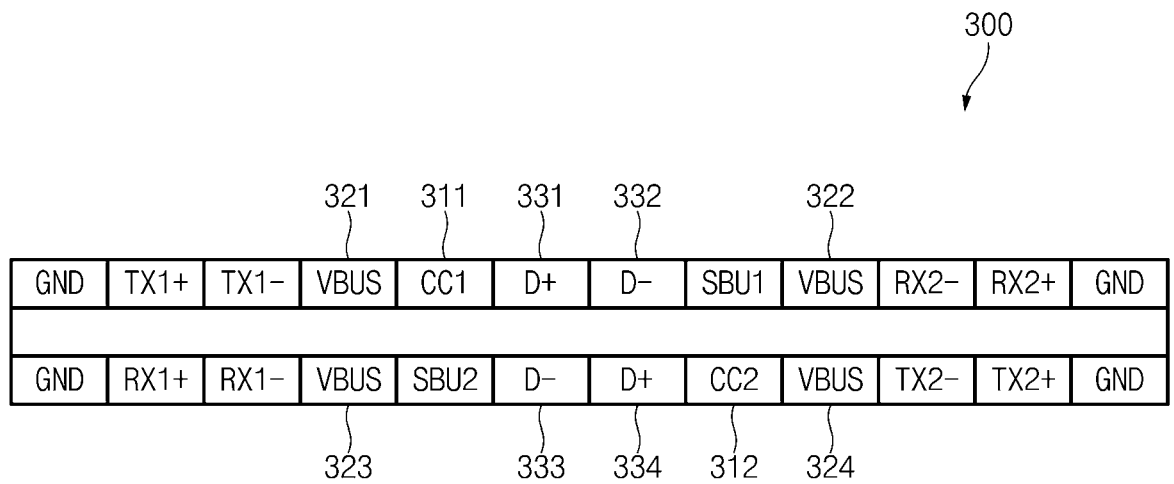
FIG. 3 illustrates a diagram of pins constituting a USB port according to an embodiment.

FIG. 3 illustrates a diagram 300 of pins 311, 312, 321, 322, 323, 324, 331, 332, 333, and 334 constituting a USB port (e.g., the USB connectors 230 and 241 of FIG. 2) according to an embodiment. The USB port according to an embodiment may be a USB Type-C port.

In an embodiment, the USB Type-C port may have 24 pins. The USB Type-C port (e.g., the USB connector 230 of FIG. 2) included in an electronic device (e.g., the electronic device 101 of FIG. 2) may be composed of pins of a receptacle structure into which a terminal may be inserted. The USB Type-C port (e.g., the USB connector 241 of FIG. 2) included in an external device (e.g., the external device 240 of FIG. 2) may be composed of pins with a plug structure capable of being inserted into a terminal. The USB Type-C port may include first pins 311 and 312, second pins 321, 322, 323, and 324, and/or third pins 331, 332, 333, and 334.

In an embodiment, the first pins 311 and 312 may be CC pins. The first pins 311 and 312 may include the CC1 pin 311 and the CC2 pin 312, respectively. The CC1 pin 311 and the CC2 pin 312 may detect the mounting state of the external device 240 when the external device 240 is connected using the USB Type-C ports 230 and 241. The CC1 pin 311 and the CC2 pin 312 may be used for the communication between the PDIC (e.g., the PDIC 223 of FIG. 2) and the USB connector 230. The first pins 311 and 312 may be two to remove the distinction between the top and bottom of a cable.

In an embodiment, the electronic device 101 may operate as the USB host mode when a Rd resistor is recognized by the CC1 pin 311 and/or CC2 pin 312. The Rd resistor may be a resistor defined in the USB Type-C specification and may be about 5.1 kΩ.

In an embodiment, the second pins 321, 322, 323, and 324 may be VBUS pins. The power may be supplied to the external device 240 through the second pins 321, 322, 323, and 324.

In an embodiment, each of the third pins 331, 332, 333, and 334 may be a D+ pin or a D− pin. The third pins 331, 332, 333, and 334 may perform USB 2.0 interface communication.

In an embodiment, the USB Type-C port may further include pins TX1+, TX1−, TX2+, TX2−, RX1+, RX1−, RX2+, and RX2− that form a high-speed data path, auxiliary bus pins SBU1 and SBU2, and/or a ground pin GND.

Figure 4:
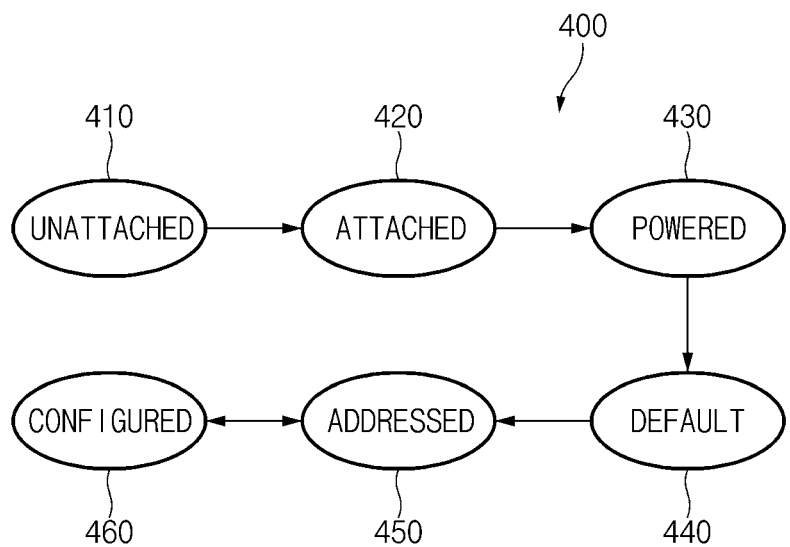
FIG. 4 illustrates a diagram of a USB enumeration process according to an embodiment.

FIG. 4 illustrates a diagram 400 of a USB enumeration process according to an embodiment. The USB enumeration process may be a process of forming an address for the respective external device 240. The USB enumeration process may include Unattached 410, Attached 420, Powered 430, Default 440, Addressed 450, and/or Configured 460.

In an embodiment, when Unattached 410 is transitioned to Attached 420, it may be determined whether there is VBUS. When the VBUS is sufficient, Attached 420 may be transitioned to Powered 430. In the process of Powered 430, the reset command may be received from the electronic device 101, and it may be determined whether there is an external device (e.g., the external device 240 in FIG. 2), using the D+ pin and/or the D− pin. In the process of Default 440, 'Set Address' command may be received from the external device 240, and a device descriptor may be read out from the electronic device 101. In the process of Addressed 450, 'Set Configuration' command may be received from the external device 240, and an address may be allocated for each device. The number of addresses may be '2 to the power −1'. For example, the number of addresses may be 127.

Figure 5:
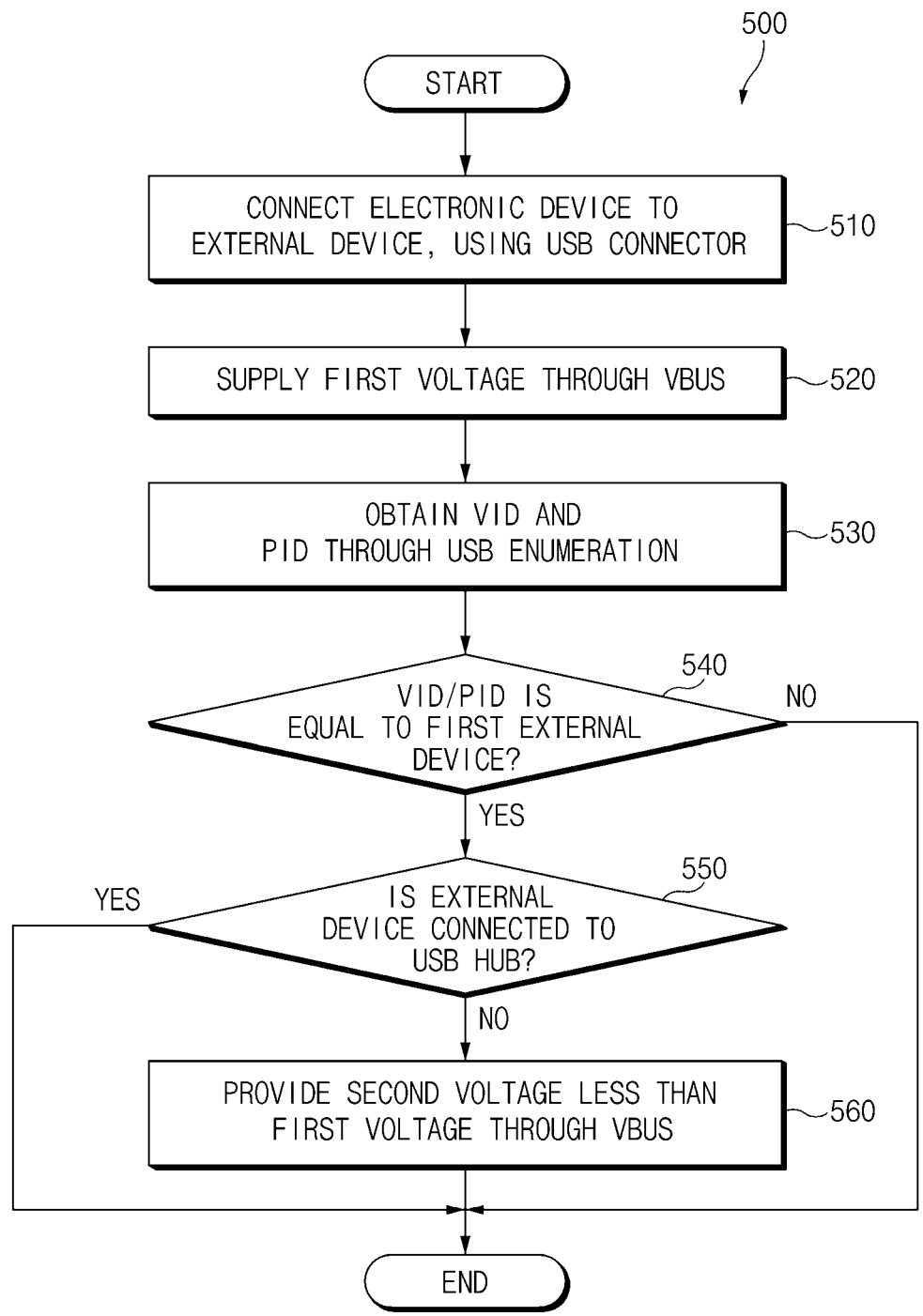
FIG. 5 illustrates a flowchart of a method of reducing power consumption when an electronic device is used in connection with an external device, according to an embodiment.

FIG. 5 illustrates a flowchart 500 of a method of reducing power consumption when the electronic device 101 is used in connection with the external device 240, according to an embodiment.

According to an embodiment, in operation 510, the external device 240 may be connected to the electronic device 101, using the USB connectors 230 and 241. The PDIC 223 of the electronic device 101 may detect the external device 240, using the first pins 311 and 312. For example, it may be determined whether an earphone of USB Type-C is connected to the USB Type-C port of the electronic device 101.

According to an embodiment, in operation 520, the charging IC 222 of the electronic device 101 may supply the first voltage through VBUS corresponding to the second pins 321, 322, 323, and 324. The first voltage may be supplied to the external device 240 to operate the external device 240. The first voltage may be a voltage obtained by boosting the voltage provided by the battery 189 of the electronic device 101. The first voltage may be about 4.75 V or more and about 5.25 V or less. For example, when the earphone of USB Type-C is connected to the USB Type-C port of the electronic device 101, the charging IC 222 may output about 5 V through the VBUS pin.

According to an embodiment, in operation 530, the USB driver 212-1 included in the processor 120 of the electronic device 101 may obtain a VID being a Vendor ID, and a PID being a Product ID through USB enumeration. When the external device 240 is first mounted on the electronic device 101, the USB driver 212-1 may recognize the VID/PID through the USB enumeration process. For example, when the earphone of USB Type-C is connected to the USB connector 230 of the electronic device 101, the USB driver 212-1 may recognize the VID/PID of the earphone of USB Type-C. For example, the USB driver 212-1 may enumerate the earphone of USB Type-C that is a USB audio device, and may determine whether the earphone of USB Type-C is correct, through a VID/PID inside the device descriptor.

According to an embodiment, in operation 540, the USB driver 212-1 included in the processor 120 of the electronic device 101 may determine whether the VID/PID is the same as the first external device. The first external device may be a device having a specified VID and a specified PID. The specified VID and the specified PID may be stored in the memory of the electronic device 101 (e.g., the memory 130 of FIG. 1). The USB driver 212-1 may determine whether the VID/PID obtained from the external device 240 is the same as the specified VID and the specified PID, using the third pins 331, 332, 333, and 334 of the USB connector 230. When the VID/PID is the same as the first external device (operation 540—YES), the USB driver 212-1 may proceed to operation 550. When the VID/PID is not the same as the first external device (operation 540—NO), the USB driver 212-1 may terminate additional check; while the external device 240 is connected, the charging IC 222 may supply the first voltage to the external device 240 via VBUS of the USB connector 230.

According to an embodiment, in operation 550, the USB driver 212-1 included in the processor 120 of the electronic device 101 may determine whether the external device 240 is connected to a USB hub. The USB hub may be an auxiliary device capable of connecting a plurality of external devices 240 supporting USB to a single USB port. When the USB hub is connected, the external device 240 may operate normally when power is supplied constantly without reducing the voltage. USB may be also connected to the external device 240 through a USB hub; when the earphone of USB Type-C is connected via the USB hub, the operating voltage of the USB hub needs to secure about 5 V. In a state where the external device 240 is connected to the USB hub (operation 550—YES), the USB driver 212-1 may terminate additional check; while the external device 240 is connected, the charging IC 222 may supply the first voltage to the external device 240 via VBUS of the USB connector 230; in this case, the charging IC 222 may maintain a voltage of about 5 V without lowering the voltage to about 4.5 V on the VBUS pin. When the external device 240 is not connected to the USB hub (operation 550—NO), the USB driver 212-1 may proceed to operation 560.

According to an embodiment, in operation 560, the USB driver 212-1 included in the processor 120 of the electronic device 101 may provide a second voltage less than the first voltage through VBUS. When the first external device is connected to the USB connector 230, the USB driver 212-1 may transmit, to the charging driver 212-2, a first signal for allowing the charging IC 222 to output the second voltage having a magnitude smaller than the first voltage. The second voltage may be about 4.35 V or more and about 4.7 V or less.

In an embodiment, the first external device may be set as the earphone of USB Type-C. In this case, the USB driver 212-1 may determine whether the connected external device 240 is the earphone of USB Type-C, using VID/PID. In a state that the USB hub device is not connected, when a USB Type-C earphone is connected, the USB driver 212-1 may call a callback function of reducing the voltage on the VBUS pin. The USB driver 212-1 may reduce the magnitude of voltage output from the charging IC 222 through the VBUS pin. For example, the USB driver 212-1 may reduce the magnitude of voltage output from the charging IC 222 through the VBUS pin, from about 5 V to about 4.5 V, thereby reducing the power consumption by about 14 mW. The operating voltage of the USB Type-C earphone may be about 3.1 V or more and about 5.5 V or less. Accordingly, in the case where the external device 240 connected to the electronic device 101 is the USB Type-C earphone, when the USB driver 212-1 reduces the magnitude of voltage supplied from the VBUS pin from about 5 V to about 4.5 V, the power consumption may be reduced while the USB Type-C earphone are operated normally.

In an embodiment, in a state where the USB Type-C earphone is operated and the set is turned on, the voltage of the battery 189 may be about 3.4 V or more and about 4.4 V or less. As such, a boost circuit operation may be required to output the voltage having a constant magnitude from the battery 189 having a variable voltage range to the USB Type-C earphone. To operate the stable boost circuit, the voltage provided to the Type-C earphone being the output voltage needs to be higher than the voltage of the battery 189 which is the input voltage of the boost circuit. Accordingly, it may be configured to output a voltage of about 4.5 V higher than the maximum voltage that the battery 189 may have, through the VBUS pin.

Figure 6:
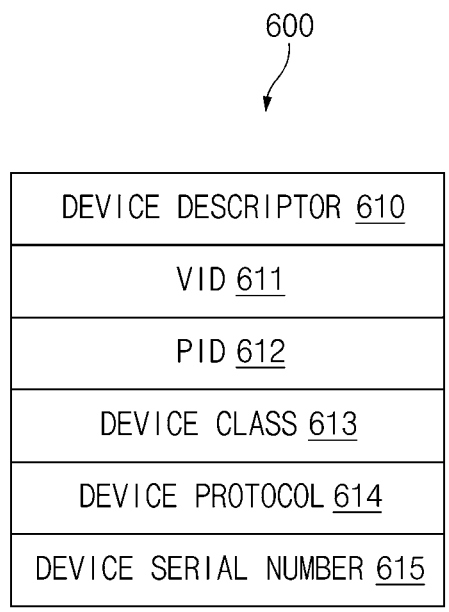
FIG. 6 illustrates a diagram of a device descriptor according to an embodiment.

FIG. 6 illustrates a diagram 600 of a device descriptor 610 according to an embodiment.

In an embodiment, the device descriptor 610 may include various pieces of information and descriptions, which are associated with the external device 240. The device descriptor 610 may include a VID 611 and a PID 612. The USB controller 221 may obtain the device descriptor 610 using the third pins 331, 332, 333, and 334, and may identify the VID 611 and PID 612 of the external device 240. The VID 611 may be a specified identifier such as 0X04E8. The PID 612 may be identifiers in a specified range, such as 0XA50 to 0XA55.

In an embodiment, the device descriptor 610 may include the type, communication method, and/or detailed product information of the external device 240, such as the device class 613, a device protocol 614, and/or a device serial number 615.

Figure 7:
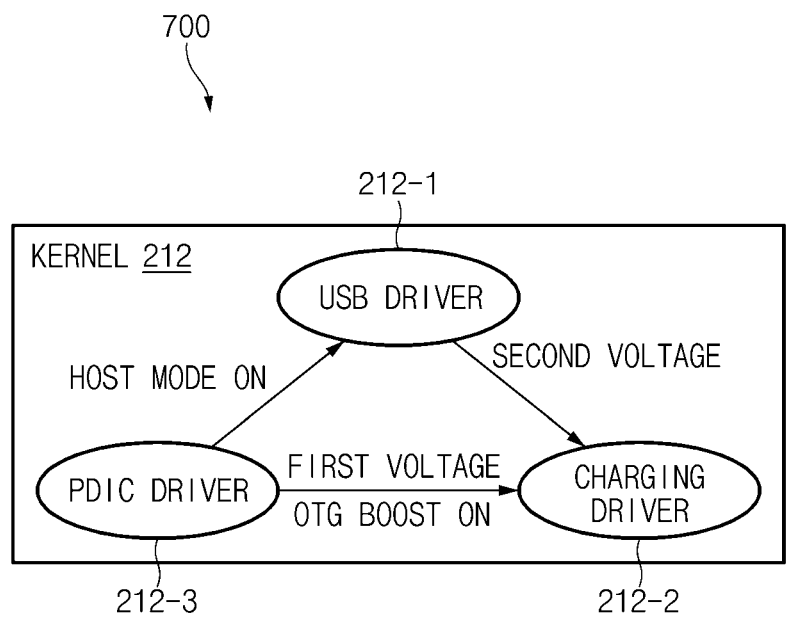
FIG. 7 illustrates a diagram of a method of reducing a voltage supplied to a charging driver by a USB driver according to an embodiment.

FIG. 7 illustrates a diagram 700 of a method of reducing a voltage supplied to the charging driver 212-2 by the USB driver 212-1 according to an embodiment.

In an embodiment, in the kernel 212, when a USB Type-C earphone is connected, the Rd resistor may be recognized by the PDIC driver 212-3. The PDIC driver 212-3 may set the USB driver 212-1 to be in "Host Mode On". The PDIC driver 212-3 may supply the first voltage to the charging driver 212-2. The PDIC driver 212-3 may control the charging driver 212-2 such that the charging driver 212-2 is in "OTG boost on" to output 5 V through the VBUS pin. When the USB driver 212-1 is in "Host Mode On", the XHCI driver included in the USB driver 212-1 is activated to start the USB enumeration process. When the USB enumeration process is started, the USB driver 212-1 may detect the VID/PID of the connected external device 240.

In an embodiment, the USB driver 212-1 may determine whether the connected external device 240 corresponds to the first external device. The USB driver 212-1 may determine whether the external device 240 connected to the electronic device 101 corresponds to the USB Type-C earphone.

In an embodiment, the USB driver 212-1 may include a USB Type-C earphone list. For example, the USB driver 212-1 may read out the USB Type-C earphone list from the memory 130. The USB driver 212-1 may read out the VID 611 and PID 612 of each of USB Type-C earphone models included (e.g., registered) in the USB Type-C earphone list.

For example, 0x04e8 may be the VID 611 of the USB Type-C earphone. For another example, 0xa057, 0xa058, 0xa054, and 0xa051 may be the PID 612 of a USB Type-C earphone.

In an embodiment, the USB driver 212-1 reads out the device descriptor 610 of the connected external device 240 to identify the VID/PID. When the identified VID/PID is matched with the VID 611 and PID 612 of each of the USB Type-C earphone models registered in the USB Type-C earphone list, the USB driver 212-1 may identify that the connected external device 240 is a USB Type-C earphone.

In an embodiment, when identifying that the detected VID/PID is a USB Type-C earphone, the USB driver 212-1 may transmit, to the charging driver 212-2, a notification message indicating that the USB Type-C earphone is connected. In an embodiment, the USB driver 212-1 may determine whether the connected external device 240 is an audio device. The USB driver 212-1 may identify the VID/PID of the connected device when the audio device is connected. When the identified VID/PID is matched with the VID 611 and PID 612 of each of the USB Type-C earphone models registered in the USB Type-C earphone list, the USB driver 212-1 may notify the charging driver 212-2 that a USB Type-C earphone is connected.

In an embodiment, the charging driver 212-2 receiving the notification message may output a second voltage lower than the first voltage by changing OTG boost settings. The charging driver 212-2 may reduce the voltage of the VBUS output from the charging IC 222 from about 5 V to about 4.5 V.

In an embodiment, the charging driver 212-2 may allow the charging IC 222 to supply a voltage to external power supply pins. That is, the charging driver 212-2 may be in "OTG boost on". To reduce the magnitude of a voltage from the first voltage to the second voltage, the charging driver 212-2 may set the output voltage value of the output voltage adjustment function of setting the output voltage to the second voltage.

In an embodiment, in the OTG boost settings, the charging driver 212-2 may set the output voltage to 4500 mV, that is, 4.5 V, in the output voltage adjustment function.

Figure 8:
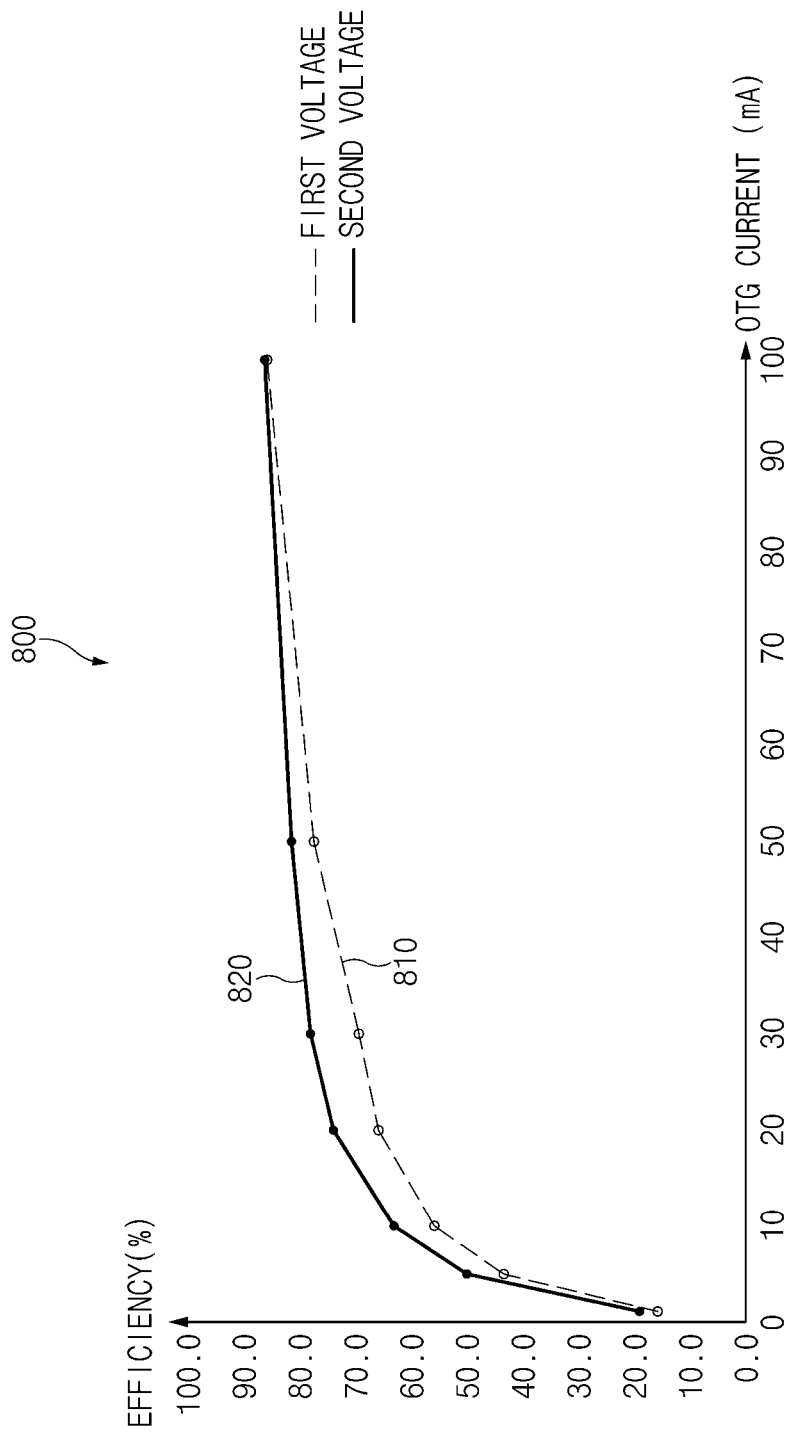
FIG. 8 illustrates a graph showing that efficiency increases when a USB driver reduces a voltage supplied to a charging driver, according to an embodiment.

FIG. 8 illustrates a graph 800 showing that efficiency is increased when the USB driver 212-1 reduces a voltage supplied to the charging driver 212-2, according to an embodiment.

In an embodiment, the efficiency of OTG boost according to OTG current may be changed. The efficiency may increase when the OTG current increases.

In an embodiment, the efficiency may be increased in the case of the boost to a second voltage 820 as compared to the boost to a first voltage 810. For example, as compared to the case of the operation at the boost voltage of about 5.1 V, in the case of the operation at the boost voltage of about 4.5 V, the power consumption of about 14 mW may be reduced and the current consumption may be reduced to about 5 mA.

Figure 9:
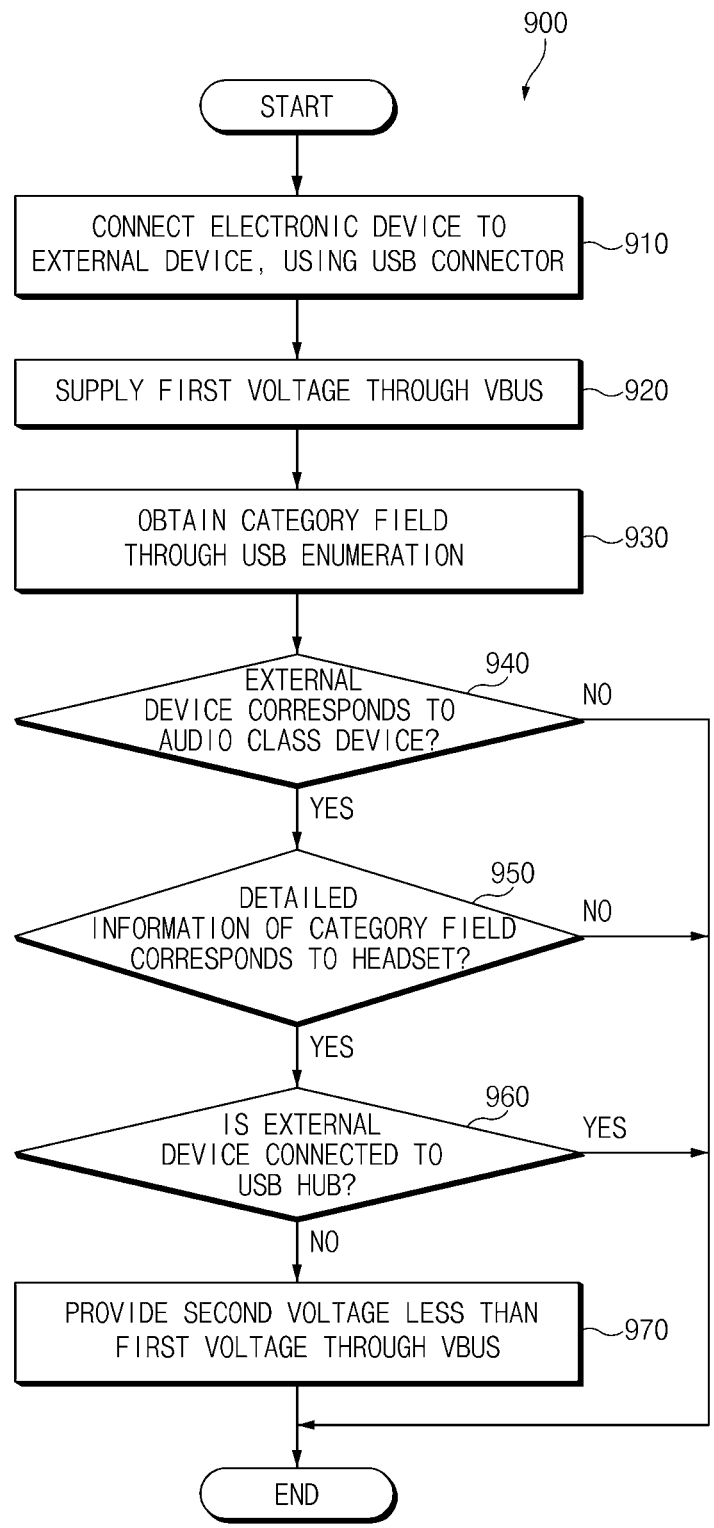
FIG. 9 illustrates a flowchart of a method of reducing power consumption when an electronic device is used in connection with an external device, according to another embodiment.

FIG. 9 illustrates a flowchart 900 of a method of reducing power consumption when the electronic device 101 is used in connection with the external device 240, according to another embodiment.

According to an embodiment, in operation 910, the external device 240 may be connected to the electronic device 101, using the USB connectors 230 and 241.

According to an embodiment, in operation 920, the charging IC 222 of the electronic device 101 may supply the first voltage through VBUS corresponding to the second pins 321, 322, 323, and 324.

In operation 930, the USB driver 212-1 of the electronic device 101 according to an embodiment may obtain a category field through USB enumeration. When the external device 240 is a USB audio class device, the USB driver 212-1 may transmit and receive VID/PID and audio control interface descriptor with the external device 240 during enumeration.

According to an embodiment, in operation 940, the USB driver 212-1 of the electronic device 101 may determine whether the external device 240 corresponds to an audio class device. When a USB audio class device is connected, the category field may be obtained using the audio control interface descriptor. When the external device 240 is an audio class device (operation 940—YES), the USB driver 212-1 may proceed to operation 950. When the external device 240 is not an audio class device (operation 940—NO), the USB driver 212-1 may terminate additional check; while the external device 240 is connected, the charging IC 222 may supply the first voltage to the external device 240 via VBUS.

According to an embodiment, in operation 950, the USB driver 212-1 of the electronic device 101 may determine whether the detailed information of the category field corresponds to a headset. The category field included in the audio control interface descriptor may have the detailed information associated with the external device 240. For example, the category field may have a value called an audio function category code. When the detailed information of the category field corresponds to a headset (operation 950—YES), the USB driver 212-1 may proceed to operation 960. When the detailed information of the category field does not correspond to a headset (operation 950—NO), the USB driver 212-1 may terminate additional check; while the external device 240 is connected, the charging IC 222 may supply the first voltage to the external device 240 via VBUS.

According to an embodiment, in operation 960, the USB driver 212-1 of the electronic device 101 may determine whether the external device 240 is connected to a USB hub. In a state where the external device 240 is connected to the USB hub (operation 960—YES), the USB driver 212-1 may terminate additional check; while the external device 240 is connected, the charging IC 222 may supply the first voltage to the external device 240 via VBUS; in this case, the charging IC 222 may maintain a voltage of about 5 V without lowering the voltage to about 4.5 V on the VBUS pin. When the external device 240 is not connected to the USB hub (operation 960—NO), the USB driver 212-1 may proceed to operation 970.

According to an embodiment, in operation 970, the USB driver 212-1 of the electronic device 101 may allow the charging IC 222 to supply the second voltage less than the first voltage through VBUS. When the headset is connected to the USB connector 230, the USB driver 212-1 may transmit, to the charging IC 222, a first signal for allowing the charging IC 222 to output the second voltage having a magnitude smaller than the first voltage.

Figure 10:
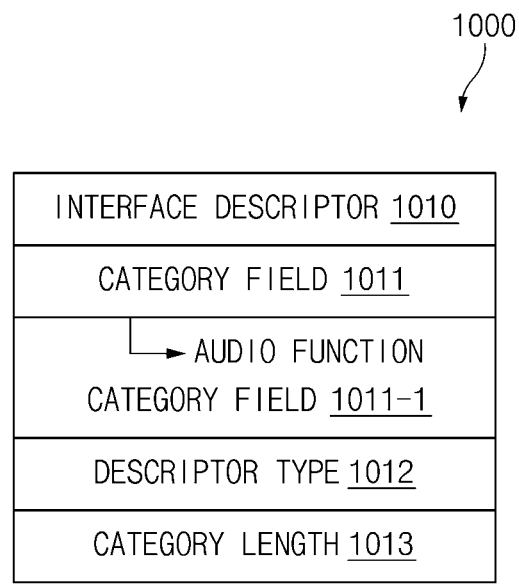
FIG. 10 illustrates a diagram of an interface descriptor according to an embodiment.

FIG. 10 illustrates a diagram 1000 of an interface descriptor 1010 according to an embodiment.

In an embodiment, the interface descriptor 1010 may include information associated with the type of interface, such as a category field 1011, a descriptor type 1012, and/or a category length 1013. The category field 1011 may include an audio function category field 1011-1. The audio function category field 1011-1 may be a constant value specified as a category field in the interface descriptor 1010; the main use of the audio function may be defined in the audio function category field 1011-1 depending on the intent of a manufacturer. The audio function category field 1011-1 may include an audio function category code.

FIG. 11 illustrates a diagram 1100 of an audio function category code 1010-1 according to an embodiment. The audio function category code 1010-1 may be a specified value for each type of the external device 240 in the audio function category field 1011-1. The audio function category code 1010-1 may assign a value of 0x01 to a speaker, may assign a value of 0x02 to a home theater, may assign a value of 0x03 to a microphone, and may assign a value of 0x04 to a headset. Accordingly, when the code value of the audio function category field 1011-1 in the category field 1011 of the external device 240 is '0x04', the voltage may be reduced by determining that the headset is connected and making a request for a voltage adjustment to the charging IC 222. As such, when "Audio Function SubClass" is a headset, the VBUS voltage may be reduced from about 5 V to about 4.5 V.

Figure 12:
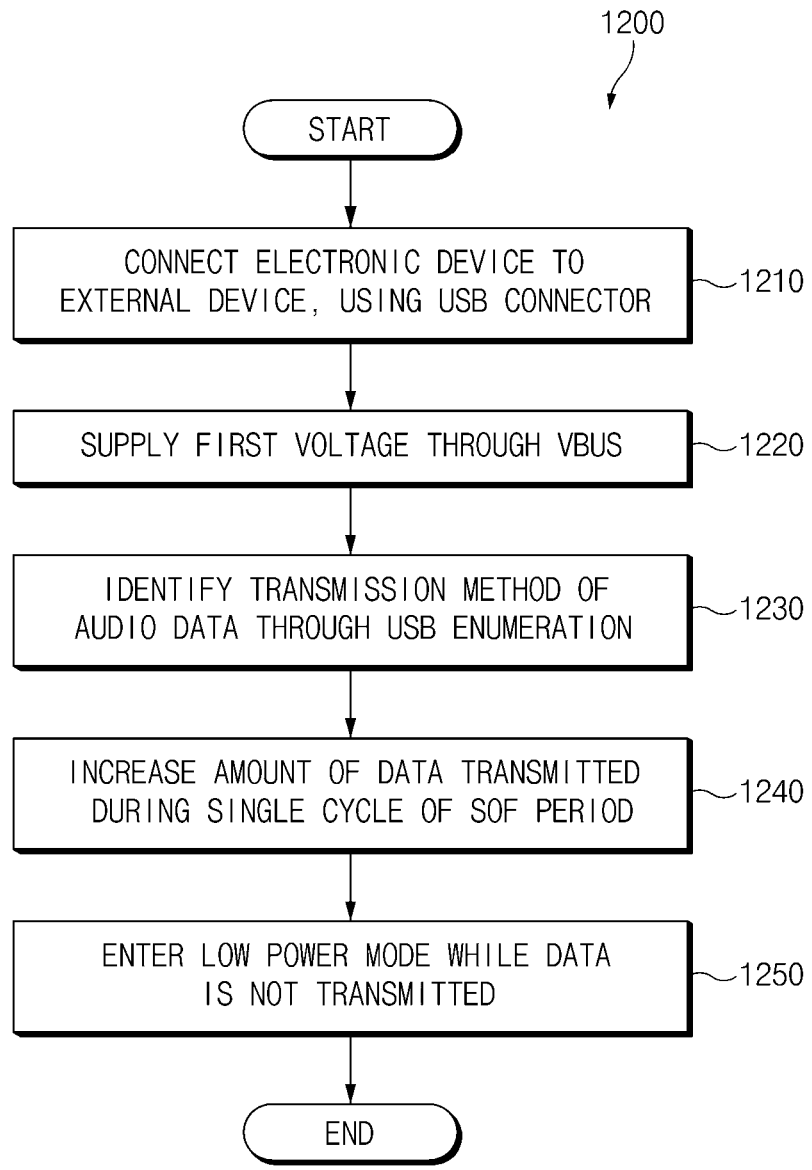
FIG. 12 illustrates a flowchart of a method of reducing power consumption when an electronic device is used in connection with an external device, according to still another embodiment.

FIG. 12 illustrates a flowchart 1200 of a method of reducing power consumption when the electronic device 101 is used in connection with the external device 240, according to still another embodiment.

According to an embodiment, in operation 1210, the external device 240 may be connected to the electronic device 101, using the USB connectors 230 and 241.

According to an embodiment, in operation 1220, the charging IC 222 of the electronic device 101 may supply the first voltage through VBUS corresponding to the second pins 321, 322, 323, and 324.

According to an embodiment, in operation 1230, the USB driver 212-1 of the electronic device 101 may identify the transmission method of audio data through USB enumeration. When the external device 240 is an audio device such as a USB Type-C earphone, multi-configuration may be supported. The electronic device 101 may transmit audio data to the external device 240, using an isochronous scheme. The isochronous scheme may be a data transmission scheme used when data is received temporally continuously and the data is output. The isochronous scheme may be a data transmission scheme in which data integrity is not secured, such as User Datagram Protocol (UDP).

According to an embodiment, in operation 1240, the USB driver 212-1 of the electronic device 101 may increase the amount of data transmitted during a single cycle of start of frame (SOF) period. In SOF, data may be output at a period of about 1 ms in the case of a full speed. In the case of a high speed, data may be output at a period of about 125 µs. The USB controller 221 may increase the first amount, which is the output amount of data output at the first period being a specified period, to the maximum value specified in the isochronous scheme.

According to an embodiment, in operation 1250, the USB driver 212-1 of the electronic device 101 may enter a low power mode while data is not being transmitted. The USB driver 212-1 frequently enters the low power mode by transmitting as much audio data as possible in a single SOF period, thereby reducing the power consumption used by the USB (e.g., the USB 242-1 in FIG. 2) of the external device 240.

Figure 13:
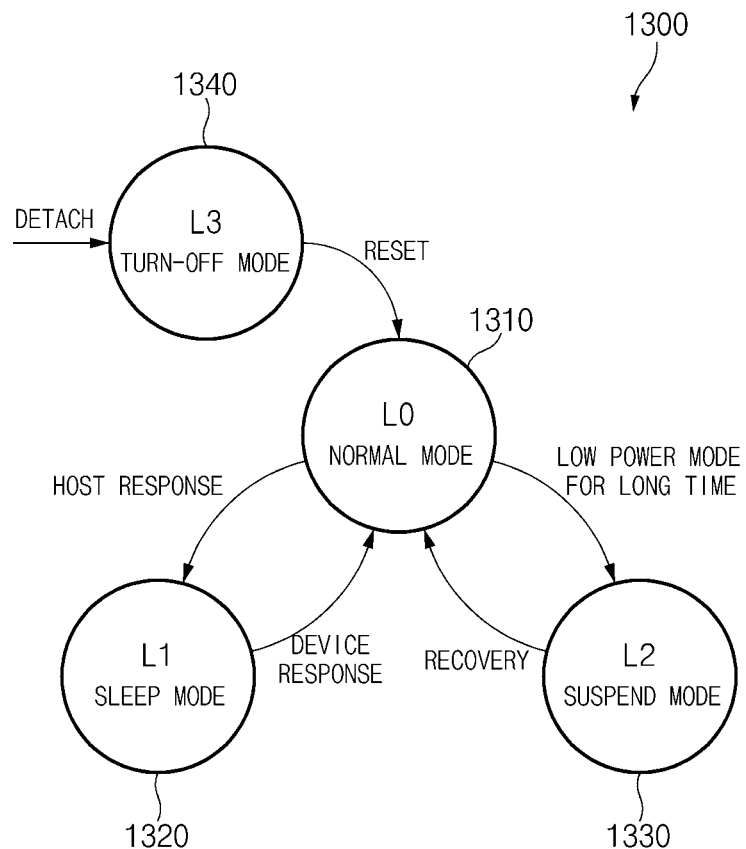
FIG. 13 illustrates a diagram of a normal mode and low power modes (LPMs) according to an embodiment.

FIG. 13 illustrates a diagram 1300 of a normal mode 1310 and low power modes (LPMs) 1320, 1330, and 1340 according to an embodiment.

In an embodiment, the normal mode 1310 may be a mode in which the electronic device 101 normally transmits and receives data to and from the external device 240. The normal mode 1310 may be defined as L0. The low power modes 1320, 1330, and 1340 may be modes capable of being entered when the electronic device 101 does not transmit and receive data to and from the external device 240. The low power modes 1320, 1330, and 1340 may be defined as the L1 mode 1320, the L2 mode 1330, and the L3 mode 1340, respectively. The L1 mode 1320 may be a sleep mode; the L2 mode 1330 may be a suspend mode; and the L3 mode 1340 may be a turn-off mode.

In an embodiment, in the L0 mode 1310, the electronic device 101 may transmit a host response to the external device 240 and may enter the L1 mode 1320. In the L1 mode 1320, the electronic device 101 may receive a device response from the external electronic device 240 and may enter the L0 mode 1310.

In an embodiment, when being in the low power mode for a long time as compared to the L1 mode 1320, the electronic device 101 may enter the L2 mode 1330 from the L0 mode 1310. For example, when the electronic device 101 does not transmit or receive data to and from the external device 240 for about 10 µs, the electronic device 101 may transmit a host response to the external device 240 and may enter the L1 mode 1320; when the electronic device 101 does not transmit or receive data with the external device 240 for about 3 ms, the electronic device 101 may enter the L2 mode 1330. For another example, when the electronic device 101 receives a specified signal from the external device 240 for a time of about 70 µs or more and about 1 ms or less, the electronic device 101 may enter the L0 mode 1310 from the L1 mode 1320; when the electronic device 101 receives a specified signal from the external device 240 for about 30 ms or more, the electronic device 101 may receive a recovery command and may enter the L0 mode 1310 from the L2 mode 1330.

In an embodiment, when being separated from the external device 240, the electronic device 101 may enter the L3 mode 1340. When the electronic device 101 is connected again to the external device 240 and then reset, the electronic device 101 may recover from the L3 mode 1340 to the L0 mode 1310.

In an embodiment, the electronic device 101 frequently enters the L1 mode 1320 being one of low-power modes by transmitting as much audio data as possible in a single SOF period, thereby reducing the power consumption used by the USB 242-1 of the external device 240.

According to various embodiments, an electronic device (e.g., the electronic device 101 of FIG. 2) may include a power delivery IC (e.g., the PDIC 223 of FIG. 2) determining whether an external device (e.g., the external device 240 of FIG. 2) is connected to an USB port (e.g., the USB connector 230 of FIG. 2), a charging IC (e.g., the charging IC 222 of FIG. 2) supplying power from a battery (e.g., the battery 189 of FIG. 1) of the electronic device 101 to the external device 240 through the USB port 230, and a processor (e.g., the USB driver 212-1 of FIG. 2) controlling the charging IC 222. The power delivery IC 223 may determine whether the external device 240 is connected to the USB port 230, through a first pin (e.g., the first pins 311 and 312 of FIG. 3) of the USB port 230. When the external device 240 is connected to the USB port 230, the charging IC 222 may output a first voltage (e.g., the first voltage 810 of FIG. 8), which is a voltage obtained by boosting a voltage provided by the battery 189, to the external device 240 through a second pin (e.g., the second pins 321, 322, 323, and 324 of FIG. 3). The processor 120 may be configured to determine whether the external device 240 connected to the USB port 230 is a first external device having a specified VID (e.g., the VID 611 of FIG. 6) and a specified PID (e.g., the PID 612 of FIG. 6), through a third pin (e.g., the third pins 331, 332, 333, and 334 of FIG. 3) of the USB port 230, and to transmit a first signal, which controls the charging IC 222 to output a second voltage (e.g., the second voltage 820 of FIG. 8) having a magnitude less than the first voltage 810, to the charging IC 222. when the first external device is connected to the USB port 230.

In an embodiment, the processor 120 may be configured to determine whether a USB hub is connected to the USB port, when the first external device is connected to the USB port 230 and to transmit the first signal to the charging IC 222 when the USB hub is not connected.

In an embodiment, the USB port 230 may be a USB Type-C port, and the first external device may be a USB Type-C earphone.

In an embodiment, the first pin 311 or 312 may be a CC1 pin and/or a CC2 pin. The second pin 321, 322, 323, or 324 is a VBUS pin. The third pin 331, 332, 333, or 334 may be a D+ pin and/or a D- pin.

In an embodiment, the processor 120 may be configured to read out a device descriptor (e.g., the device descriptor 610 of FIG. 6) including the specified VID 611 and the specified PID 612 in an enumeration process of forming an address for the respective external device 240.

In an embodiment, the processor 120 may be configured to transmit the first signal by including boosting reduction information, which allows the charging IC 222 to reduce boosting or allows the boosting occurs to a minimum voltage, in the first signal.

In an embodiment, the first voltage 810 may be about 4.75 V or more and about 5.25 V or less, and the second voltage 820 may be about 4.35 V or more and about 4.7 V or less.

In an embodiment, the processor 120 may be configured to increase a first amount, which is an output amount of data output every first period being a specified period, to a maximum value specified in an isochronous scheme and to switch a power state in a section other than the first period from a normal state (e.g., the normal mode 1310 of FIG. 13) to a power saving state (e.g., the low-power modes 1320, 1330, and 1340 of FIG. 13).

According to various embodiments, a method of reducing power consumption when an electronic device 101 is used in connection with an external device 240 may include determining, by a PDIC 223 of the electronic device 101, whether the external device 240 is connected to a USB port 230 of the electronic device 101, through a first pin 311 or 312 of the USB port 230, outputting, by a charging IC 222 supplying power from a battery 189 of the electronic device 101 to the external device 240 through the USB port 230, a first voltage 810, which is a voltage obtained by boosting a voltage provided by the battery 189, to the external device through a second pin 321, 322, 323, or 324 when the external device 240 is connected to the USB port 230, determining, by a processor 120 controlling the charging IC 222, whether the external device 240 connected to the USB port 230 is a first external device having a specified VID 611 and a specified PID 612, through a third pin 331, 332, 333, or 334 of the USB port 230, and transmitting, by the processor 120, a first signal for controlling the charging IC 222 to output a second voltage 820 having a magnitude less than the first voltage 810, to the charging IC 222 when the first external device is connected to the USB port 230.

According to various embodiments, an electronic device may include a power delivery IC determining whether an external device is connected to an USB port, a charging IC supplying power from a battery of the electronic device 101 to the external device 240 through the USB port 230, and a processor controlling the charging IC 222. The power delivery IC 223 may determine whether the external device 240 is connected to the USB port 230, through a first pin of the USB port 230. When the external device 240 is connected to the USB port 230, the charging IC 222 may output a first voltage, which is a voltage obtained by boosting a voltage provided by the battery 189, to the external device 240 through a second pin. The processor 120 may be configured to identify a category field (e.g., the category field 1011 of FIG. 10) of the external device 240 and to transmit a first signal for controlling the charging IC 222 to output a second voltage 820 having a magnitude less than the first voltage 810, to the charging IC 222 when detailed information (e.g., the audio function category field 1011-1 of FIG. 11) of the category field corresponds to a specified first external device.

In an embodiment, the processor 120 may be configured to transmit the first signal to the charging IC 222 when the detailed information (e.g., the audio function category field 1011-1) of the category field 1011 corresponds to a headset.

In an embodiment, the processor 120 may be configured to read out an interface descriptor (e.g., the interface descriptor 1010 of FIG. 10) including the category field 1011, in an enumeration process of forming an address for the respective external device 240.

In an embodiment, the processor 120 may be configured to transmit the first signal to the charging IC 222 when a code (e.g., the audio function category code 1010-1 in FIG. 11) of a subclass included in the category field 1011 is equal to a specified code (e.g., the headset (0x04) of FIG. 11) assigned to a headset.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed in the specification, in the case where it is identified that the specified external device is connected when an electronic device is used while an external device is connected to the USB port of an electronic device, it is possible to reduce the magnitude of the voltage output from a VBUS pin, thereby reducing the power consumption of the electronic device.

Furthermore, according to various embodiments disclosed in the specification, when an electronic device is used while an external device is connected to the USB port of an electronic device, it is possible to reduce the magnitude of the voltage output from the VBUS pin depending on the type of electronic device, thereby solving the problem of quickly discharging the battery of the electronic device and increasing the use time of the electronic device.

Moreover, according to various embodiments disclosed in the specification, when an electronic device is used while an external device is connected to the USB port of an electronic device, it is possible to increase a data communication period for the external device connected to the electronic device, thereby reducing the power consumption of the electronic device.

Besides, a variety of effects directly or indirectly understood through the disclosure may be provided.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a power delivery IC (PDIC) configured to determine whether an external device is connected to a USB port;
   a charging IC configured to supply power from a battery of the electronic device to the external device through the USB port; and
   a processor configured to control the charging IC,
   wherein:
   the PDIC determines whether the external device is connected to the USB port, through a first pin of the USB port,
   the charging IC outputs a first operating voltage, which is a voltage obtained by boosting a voltage provided by the battery, to the external device through a second pin, when the external device is connected to the USB port, and
   the processor is configured to:
   determine whether the external device connected to the USB port is a first external device comprising a specified Vendor ID (VID) and a specified Product ID (PID), through a third pin of the USB port;
   transmit audio data or voice data to the first external device through the USB port; and
   when the first external device is connected to the USB port, transmit a first signal, which controls the charging IC to output a second operating voltage comprising a magnitude less than the first operating voltage, to the charging IC.

2. The electronic device of claim 1, wherein the processor is configured to:
determine whether a USB hub is connected to the USB port, when the first external device is connected to the USB port; and
transmit the first signal to the charging IC when the USB hub is not connected.

3. The electronic device of claim 1, wherein the USB port is a USB Type-C port, and
wherein the first external device is a USB Type-C earphone.

4. The electronic device of claim 1, wherein:
the processor is configured to transmit the audio data or the voice data to the external device through the third pin of the USB port,
the first pin is one of a CC1 pin or a CC2 pin,
the second pin is a VBUS pin, and
the third pin is one of a D+ pin or a D− pin.

5. The electronic device of claim 1, wherein the processor is configured to:
read out a device descriptor including the specified VID and the specified PID in an enumeration process of forming an address for the external device connected to the USB port.

6. The electronic device of claim 1, wherein the processor is configured to:
transmit the first signal by including boosting reduction information, which allows the charging IC to reduce boosting or allows the boosting occurs to a minimum voltage, in the first signal.

7. The electronic device of claim 1, wherein:
the first operating voltage is 4.75 V or more and 5.25 V or less, and
the second operating voltage is 4.35 V or more and 4.7 V or less.

8. The electronic device of claim 1, wherein the processor is configured to:
increase a first amount, which is an output amount of data output every first period being a specified period, to a maximum value specified in an isochronous scheme; and
switch a power state in a section other than the first period from a normal state to a power saving state.

9. A method of reducing power consumption when an electronic device is used in connection with an external device, the method comprising:
determining, by a PDIC of the electronic device, whether the external device is connected to a USB port of the electronic device, through a first pin of the USB port;
based on the external device being connected to the USB port, outputting, by a charging IC supplying power from a battery of the electronic device to the external device through the USB port, a first operating voltage, which is a voltage obtained by boosting a voltage provided by the battery, to the external device through a second pin;
determining, by a processor, whether the external device connected to the USB port is a first external device comprising a specified VID and a specified PID, through a third pin of the USB port;
transmitting, by the processor, audio data or voice data to the first external device through the USB port; and
based on the first external device being connected to the USB port, transmitting, by the processor, a first signal for controlling the charging IC to output a second operating voltage comprising a magnitude less than the first operating voltage, to the charging IC.

10. The method of claim 9, wherein the transmitting of the first signal to the charging IC includes:
determining whether a USB hub is connected to the USB port, based on the first external device being connected to the USB port; and
transmitting the first signal to the charging IC based on the USB hub not being connected.

11. The method of claim 9, wherein:
the USB port is a USB Type-C port, and
the first external device is a USB Type-C earphone.

12. The method of claim 9, wherein:
the processor transmits the audio data or the voice data to the external device through the third pin of the USB port,
the first pin is one of a CC1 pin or a CC2 pin,
the second pin is a VBUS pin, and
the third pin is one of a D+ pin or a D− pin.

13. The method of claim 9, wherein the determining of whether the external device is the first external device includes:
reading out a device descriptor including the specified VID and the specified PID in an enumeration process of forming an address for the external device connected to the USB port.

14. The method of claim 9, wherein the transmitting of the first signal to the charging IC includes:
transmitting the first signal by including boosting reduction information, which allows the charging IC to reduce boosting or allows the boosting occurs to a minimum voltage, in the first signal.

15. The method of claim 9, wherein
the first operating voltage is 4.75 V or more and 5.25 V or less, and
the second operating voltage is 4.35 V or more and 4.7 V or less.

16. An electronic device comprising:
a PDIC configured to determine whether an external device is connected to a USB port;
a charging IC configured to supply power from a battery of the electronic device to the external device through the USB port; and
a processor configured to control the charging IC,
wherein:
the PDIC determines whether the external device is connected to the USB port, through a first pin of the USB port,
the charging IC outputs a first operating voltage, which is a voltage obtained by boosting a voltage provided by the battery, to the external device through a second pin, when the external device is connected to the USB port, and
the processor is configured to:
identify a category field of the external device; and
when detailed information of the category field corresponds to a specified first external device, transmit a first signal for controlling the charging IC to output a second operating voltage comprising a magnitude less than the first operating voltage to the charging IC and transmit audio data or voice data to the first external device through the USB port.

17. The electronic device of claim 16, wherein the processor is configured to:
when the detailed information of the category field corresponds to a headset, transmit the first signal to the charging IC.

18. The electronic device of claim 16, wherein the processor is configured to:
   read out an interface descriptor including the category field, in an enumeration process of forming an address for a respective external device.

19. The electronic device of claim 16, wherein the processor is configured to:
   when a code of a subclass included in the category field is equal to a specified code assigned to a headset, transmit the first signal to the charging IC.

20. The electronic device of claim 16, wherein the processor is configured to:
   increase a first amount, which is an output amount of data output every first period being a specified period, to a maximum value specified in an isochronous scheme; and
   switch a power state in a section other than the first period from a normal state to a power saving state.

* * * * *